(12) United States Patent
Seifert et al.

(10) Patent No.: US 6,431,733 B2
(45) Date of Patent: Aug. 13, 2002

(54) ILLUMINATED SPORTS BOARD

(76) Inventors: Branden W. Seifert; Kenneth Nevarez, both of 8331 Manchester Ave., #1, Playa Del Ray, CA (US) 90293

(*) Notice: Subject to any disclaimer, the term of this patent is extended or adjusted under 35 U.S.C. 154(b) by 0 days.

(21) Appl. No.: 09/929,316

(22) Filed: Aug. 14, 2001

Related U.S. Application Data

(60) Provisional application No. 60/225,062, filed on Aug. 14, 2000.

(51) Int. Cl.[7] ................................................. B60Q 3/00
(52) U.S. Cl. ........................ 362/459; 362/84; 362/486; 362/253; 362/812; 280/87.042; 280/816
(58) Field of Search .......................... 362/84, 103, 486, 362/459, 234, 253, 812; 280/87.042, 811, 816

(56) References Cited

U.S. PATENT DOCUMENTS

| 4,837,494 A | 6/1989 | Maier |
| 4,860,585 A | 8/1989 | Tuyn et al. |
| 4,997,196 A | 3/1991 | Wood .......................... 362/800 |
| 5,004,256 A | 4/1991 | Won ....................... 280/87.042 |
| 5,067,058 A | 11/1991 | Standley ....................... 362/190 |
| 5,119,277 A | 6/1992 | Copley et al. ......... 280/87.042 |
| 5,292,141 A | 3/1994 | Ekedal et al. .......... 280/87.042 |
| 5,513,080 A | * 4/1996 | Magle et al. ................ 362/459 |
| 5,738,432 A | 4/1998 | Okko et al. .................. 362/103 |
| 5,921,653 A | * 7/1999 | Chien ........................... 362/84 |
| D423,618 S | 4/2000 | Kincaid et al. |

OTHER PUBLICATIONS

Lightsheet Catalog, by Lightsheet Systems of Nashua, NH, dated Jun. 1999.

* cited by examiner

Primary Examiner—Stephen Husar
(74) Attorney, Agent, or Firm—Eric Karich

(57) ABSTRACT

An illuminated sports board has a riding platform having a top surface and a bottom surface, a microcontroller mounted on the top surface, a power source operably connected to the microcontroller, an electro-luminescent sheet positioned on the riding platform, an electrical circuit electrically connecting the microcontroller to the electro-luminescent sheet, and a translucent resin layer covering both the riding platform and the electro-luminescent sheet.

12 Claims, 3 Drawing Sheets

ILLUMINATED SPORTS BOARD

CROSS-REFERENCE TO RELATED APPLICATIONS

This application for a utility patent claims the benefit of U.S. Provisional Application No. 60/225,062, filed Aug. 14, 2000.

STATEMENT REGARDING FEDERALLY SPONSORED RESEARCH

Not Applicable

BACKGROUND OF THE INVENTION

1. Field of the Invention

This invention relates generally to sports boards such as snow boards, surfboards, and the like, and more particularly to an illuminated sports board.

2. Description of Related Art

The following art defines the present state of this field:

Wood, U.S. Pat. No. 4,997,196, teaches an illuminated skateboard that includes a string of LED's embedded in a groove located on the perimeter of the skateboard. The LED's are controlled by a microcontroller mounted upon the bottom surface of the board.

Ekedal et al., U.S. Pat. No. 5,292,141, teaches a skateboard that includes a rotatable disk mounted upon the top surface of the skateboard's riding surface. Similar systems are taught in Copley et al., U.S. Pat No. 5,119,277, and Standley, U.S. Pat. No. 5,067,058.

The prior art teaches skateboards that include lights mounted upon the board. However, the prior art does not teach the construction of a sports board that includes an electro-luminescent sheet that is integrally mounted within the illuminated sports board. The present invention fulfills these needs and provides further related advantages as described in the following summary.

SUMMARY OF THE INVENTION

The present invention teaches certain benefits in construction and use which give rise to the objectives described below.

The present invention provides an illuminated sports board. The illuminated sports board is designed to be ridden in any of a variety of sports, including surfing, sky surfing, skating, snow boarding, knee boarding, or the like, and includes an illuminated display for decorative or advertising purposes. The illuminated sports board includes a riding platform having a top surface and a bottom surface; a microcontroller mounted on the top surface; a power source operably connected to the microcontroller; an electro-luminescent sheet positioned on the riding platform; an electrical circuit electrically connecting the microcontroller to the electro-luminescent sheet; and a translucent resin layer covering both the riding platform and the electro-luminescent sheet.

A primary objective of the present invention is to provide an illuminated sports board having advantages not taught by the prior art.

Another objective is to provide a novel and eye-catching decorative feature for sports boards, useful for both decoration and advertising and promotion.

A further objective is to provide a functional lighting mechanism that becomes an integral part of the sports board, thereby providing a system that is durable and unlikely to interfere with the performance of the sports board.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

The above described drawing figures illustrate the invention, an illuminated sports board 10 that is designed to be ridden in any of a variety of sports, including surfing, sky surfing, skating, snow boarding, knee boarding, or the like, and includes an illuminated display for decorative or advertising purposes.

Figure 1:
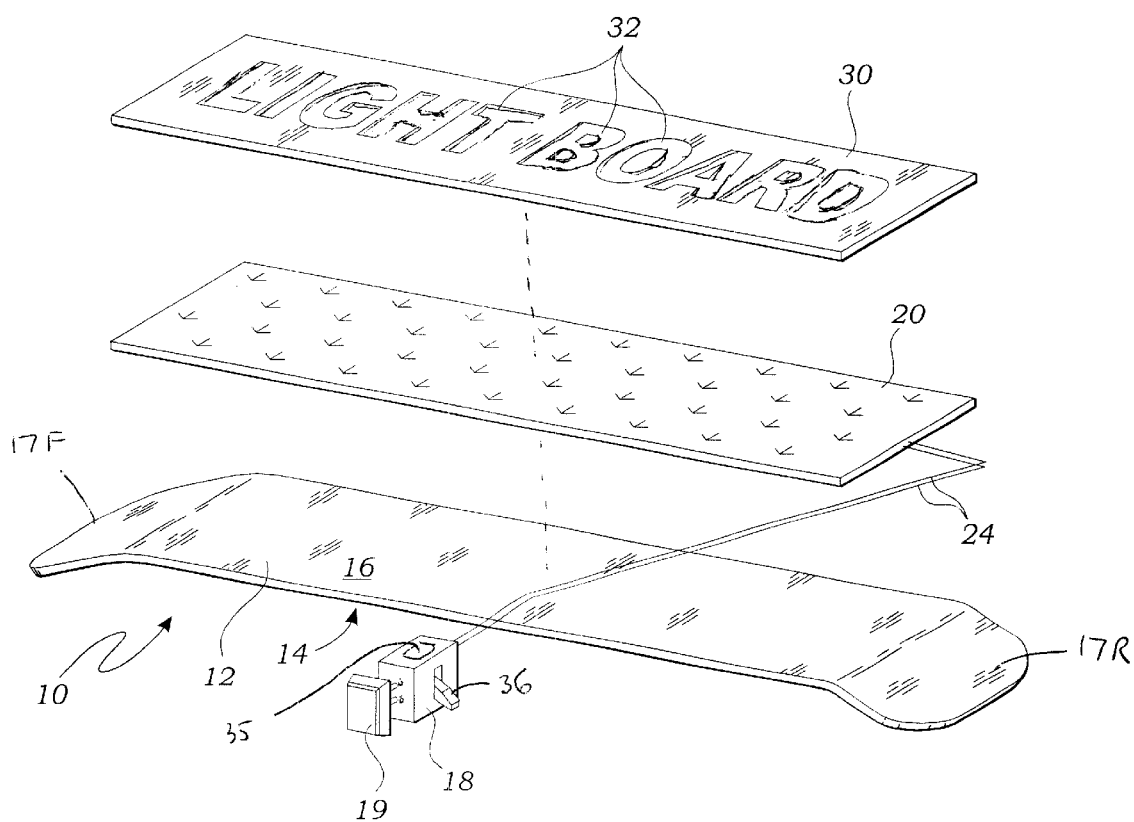
FIG. 1 is a bottom exploded perspective view of a first embodiment of the present invention.
Figure 2:
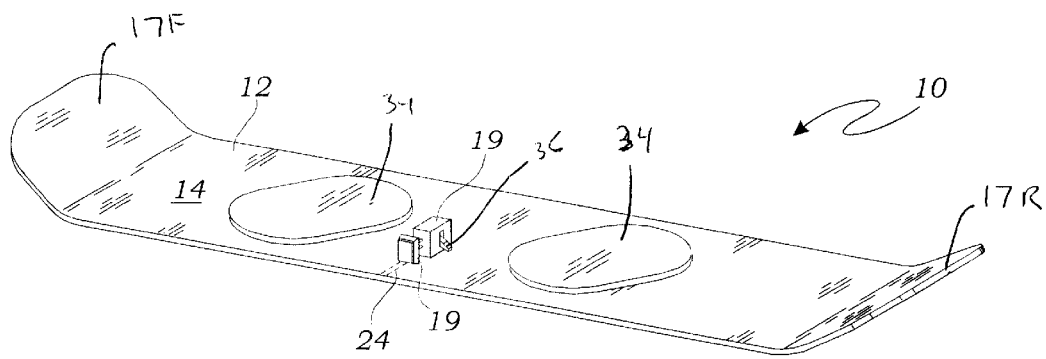
FIG. 2 is a top perspective view thereof.
Figure 3:
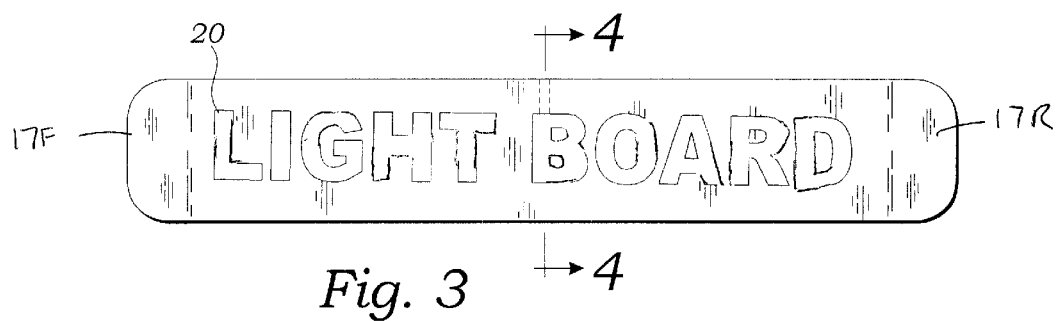
FIG. 3 is a bottom plan view thereof.
Figure 4:
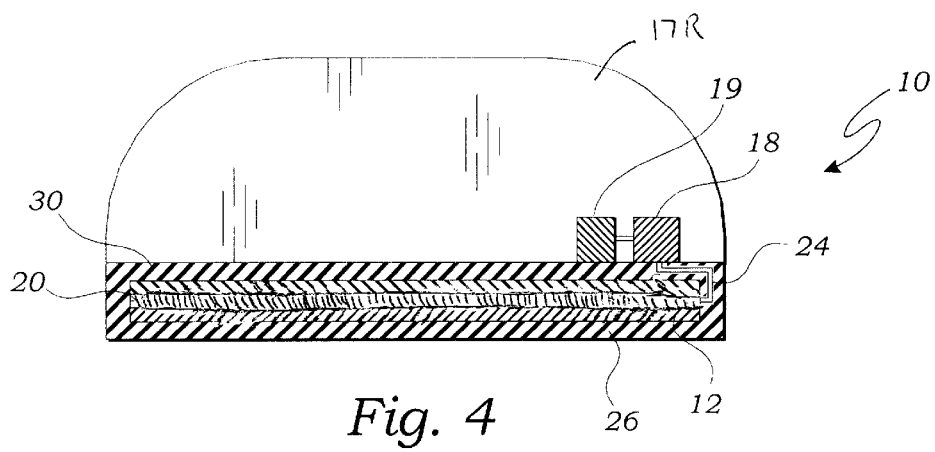
FIG. 4 is a sectional view thereof taken along line 4—4 in FIG. 3.
Figure 5:
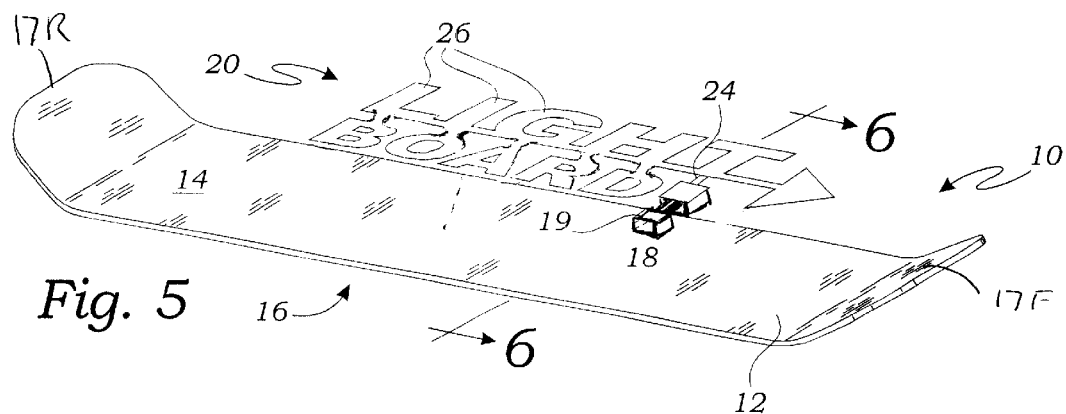
FIG. 5 is an exploded perspective view of a second embodiment of the present invention.
Figure 6:
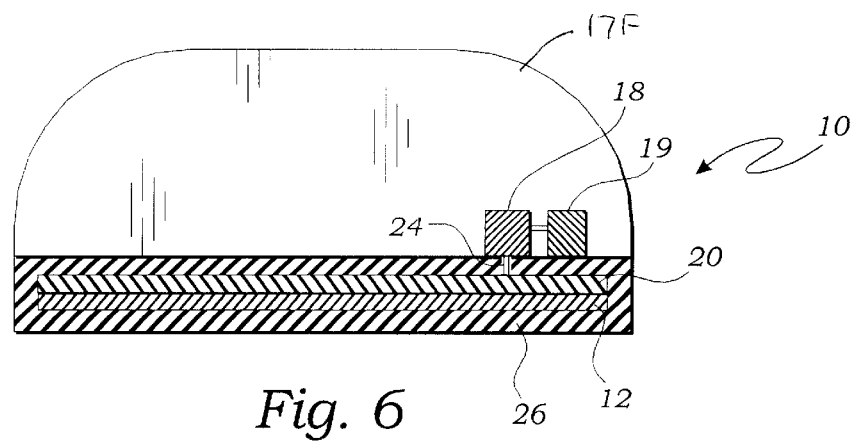
FIG. 6 is a sectional view thereof taken along line 6—6 in FIG. 5.
Figure 7:
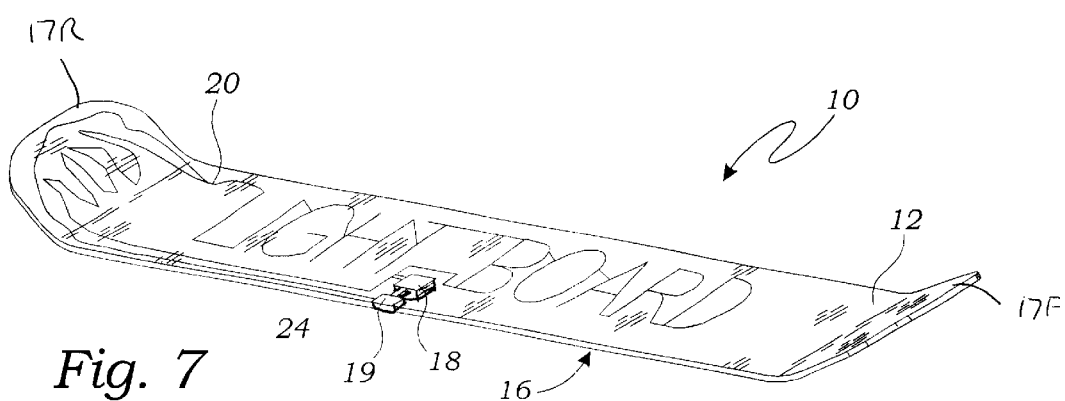
FIG. 7 is a top perspective view of a third embodiment of the present invention.

As shown in FIGS. 1–7, the illuminated sports board 10 includes a riding platform 12 having a top surface 14 and an opposing bottom surface 16. The riding platform 12 is a rigid body that supports the rider who is riding the illuminated sports board 10, preferably made of plywood or synthetic board, a foam core, or similar construction. As shown in FIGS. 2, 5, and 7, the top surface 14 is shaped to support the rider, either with a foot mounting mechanism 34 such as for attaching bindings for attaching the riding platform 12 to a rider's boots, or a gripping texture (not shown) on a flat surface that is covered with another material as described below, or similar means well known in the art.

As shown in FIG. 1, the bottom surface 16 is shaped to interact with the surface over which the rider is riding., either by sliding directly over the surface, or mounting wheels or similar means. In the case of a snow board, as shown in the preferred embodiment, the top surface 14 and the bottom surface 16 are generally smooth and the bottom surface 16 is somewhat convex, especially at front and rear ends 17F and 17R of the riding platform 12. A surfboard and wave board are somewhat similar in general shape and structure.

The illuminated sports board 10 includes a microcontroller 18 mounted on the top surface 14 and a power source 19 operably connected to the microcontroller 18, typically also mounted on the top surface 14 but potentially mounted on the microcontroller 18 itself, or even within the microcontroller 18. Other configurations are possible, such as mounting the microcontroller 18 within the illuminated sports board 10 or in a protected structure on the bottom surface 16, but it is preferred that the microcontroller 18 and the power source 19 be mounted on the top surface 14 so that they are not damaged during use of the illuminated sports board 10.

The microcontroller 18 and the power source 19, together, enable the operative control of an electro-luminescent sheet 20 positioned on the riding platform 12 through an electrical circuit 24 electrically connecting the microcontroller 18 to the electro-luminescent sheet 20. In a first embodiment, as shown in FIGS. 1–4, the electro-luminescent sheet 20 is mounted on the bottom surface 16 of the riding platform 12; however, in an alternative embodiment, as shown in FIGS. 5–7, the electro-luminescent sheet 20 is mounted on the top surface 14 of the riding platform 12.

The electro-luminescent sheet 20 is preferably a thin, flexible material that includes a light-emitting phosphor layer coated over a solid 26-gauge silver-plated copper core that emits light when an electrical current is applied. In the preferred embodiment, as shown in FIGS. 1–6, the electro-luminescent sheet 20 is preferably the electronic lighting material sold under the name LIGHTSHEET™ by Light-Sheet Systems, Inc., of Nashua, N.H. In an alternative embodiment, as shown in FIG. 7, the electro-luminescent sheet 20 is shaped as a wire, such as the LIGHTLINE™, also sold by LightSheet Systems, Inc., of Nashua, N.H. Those skilled in the art can, of course, select alternative and equivalent materials that are equally useful in the practice of this invention, and such alternative materials should be considered within the scope of the claimed invention.

The microcontroller 18 operates to control power from the power source 19 to the electro-luminescent sheet 20. The power source 19 is preferably an ordinary 9 volt DC battery. Those skilled in the art can devise many versions of the microcontroller 18 for enabling control of the electro-luminescent sheet 20. The microcontroller 18 preferably includes a converter 35 for converting the DC power to a high frequency AC signal required by the electro-luminescent sheet 20. The microcontroller 18 preferably further includes a switch 36 for controlling the flow of power to the electro-luminescent sheet 20; however, merely inserting or removing the power source 19 can also serve this function. The microcontroller 18 is preferably the DC to AC converter sold under the name LIGHTDRIVE™ by Light-Sheet Systems, Inc., of Nashua, N.H.

As shown in FIGS. 4 and 6, the illuminated sports board 10 is covered by a translucent resin layer 26 covering both the riding platform 12 and the electro-luminescent sheet 20. The translucent resin layer 26 not only seals the illuminated sports board 10 and the electro-luminescent sheet 20, it preferably also serves to mount the microcontroller 18 and the power source 19 onto the riding platform 12; however, the power source 19 is preferably not sealed because the power source 19 is preferably capable of being changed or charged. It is worth noting, however, that if the power source 19 is designed to be charged remotely, such as through induction, the power source 19 could be completely sealed under the translucent resin layer 26. The translucent resin layer 26 is preferably transparent resin that is currently used in the construction of surfboards, snow boards, or whatever type of board is used. Such resins, catalysts, and related constituents are well known to those skilled in the art, and are therefore not discussed in greater detail herein.

In a first embodiment, as shown in FIGS. 1–4, the illuminated sports board 10 includes a non-translucent layer 30 that has a plurality of shaped apertures 32, the non-translucent layer 30 being positioned between the electro-luminescent sheet 20 and the translucent resin layer 26. The non-translucent layer 30 is preferably nylon or similar material, and serves to cover a portion of the electro-luminescent sheet 20 without adding significant weight or bulk to the illuminated sports board 10.

In an alternative embodiment, as shown in FIGS. 5 and 6, the electro-luminescent sheet 20 is shaped to form a plurality of decorative symbols 22. By cutting the electro-luminescent sheet 20 itself into the plurality of decorative symbols 22, it is not necessary to include the non-translucent layer 30.

In a final embodiment, as shown in FIG. 7, the electro-luminescent sheet 20 is in the form of a wire, as described above. In this embodiment, the wire of the electro-luminescent sheet 20 is positioned upon the riding platform 12 to form a planar array of decorative patterns. This is similar to the sheet form of the electro-luminescent sheet 20, and is considered equivalent.

The invention includes a method for manufacturing the illuminated sports board 10 described above. First, a riding platform 12 having a top surface 14 and a bottom surface 16 is provided. The microcontroller 18 and the power source 19 are mounted on the top surface 14 and operatively connected to the electro-luminescent sheet 20. As shown in FIGS. 1–4, the electro-luminescent sheet 20 is positioned on the bottom surface 16. In an alternative embodiment, as shown in FIGS. 5 and 6, the electro-luminescent sheet 20 is positioned upon the top surface 14.

Finally, as shown in FIG. 6, the riding platform 12 and the electro-luminescent sheet 20 are covered with a translucent resin layer 26, which is then allowed to dry and harden. In an alternative embodiment, as shown in FIGS. 1 and 4, the electro-luminescent sheet 20 is first covered with the non-translucent layer 30 before the translucent resin layer 26 is applied.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An illuminated sports board comprising:
   a riding platform having a top surface and a bottom surface;
   a microcontroller mounted on the top surface;
   a power source operably connected to the microcontroller;
   an electro-luminescent sheet positioned on the riding platform;
   an electrical circuit electrically connecting the microcontroller to the electro-luminescent sheet; and
   a translucent resin layer covering both the riding platform and the electro-luminescent sheet.

2. The illuminated sports board of claim 1 further comprising a non-translucent layer that has a plurality of shaped apertures, the non-translucent layer being positioned between the electro-luminescent sheet and the translucent resin layer.

3. The illuminated sports board of claim 1 wherein the electro-luminescent sheet is shaped to form a plurality of decorative symbols.

4. The illuminated sports board of claim 1 wherein the electro-luminescent sheet is mounted on the bottom surface.

5. The illuminated sports board of claim 1 wherein the electro-luminescent sheet is mounted on the top surface.

6. A method for manufacturing an illuminated sports board, the method comprising the steps of:
   a) providing a riding platform having a top surface and a bottom surface;
   b) providing a microcontroller having a power source;
   c) mounting the microcontroller on the top surface;

d) providing an electro-luminescent sheet;

e) positioning the electro-luminescent sheet on the riding platform;

f) connecting the microcontroller electronically to the electro-luminescent sheet;

g) covering the riding platform and the electro-luminescent sheet with a translucent resin layer; and h) allowing the translucent resin layer to harden.

7. The method of claim 6 wherein the electro-luminescent sheet is shaped to form a plurality of decorative symbols.

8. The method of claim 6 wherein the electro-luminescent sheet is positioned on the bottom surface.

9. The method of claim 6 wherein the electro-luminescent sheet is positioned on the top surface.

10. A method for manufacturing an illuminated sports board, the method comprising the steps of:

a) providing a riding platform having a top surface and a bottom surface;

b) providing a microcontroller having a power source;

c) mounting the microcontroller on the top surface;

d) providing an electro-luminescent sheet;

e) positioning the electro-luminescent sheet on the riding platform;

f) connecting the microcontroller electronically to the electro-luminescent sheet;

g) providing a non-translucent layer that has a plurality of shaped apertures;

h) positioning the non-translucent layer being over the electro-luminescent sheet;

i) covering the riding platform, the electro-luminescent sheet, and the non-translucent layer with a translucent resin layer; and j) allowing the translucent resin layer to harden.

11. The method of claim 10 wherein the electro-luminescent sheet is positioned on the bottom surface.

12. The method of claim 10 wherein the electro-luminescent sheet is positioned on the top surface.

* * * * *